United States Patent [19]

Horton

[11] 4,252,107

[45] Feb. 24, 1981

[54] SOLAR TRACKING CONCENTRATOR

[75] Inventor: Richard H. Horton, Schenectady, N.Y.

[73] Assignee: General Electric Company, Schenectady, N.Y.

[21] Appl. No.: 898,094

[22] Filed: Apr. 20, 1978

[51] Int. Cl.$^3$ .............................................. F24J 3/02
[52] U.S. Cl. .................................. 126/438; 126/424; 126/433; 165/105; 350/289; 350/296
[58] Field of Search ............... 126/270, 271, 424, 425, 126/438, 439, 433, 451; 60/641; 350/292, 288, 293, 296, 289; 165/105

[56] References Cited

U.S. PATENT DOCUMENTS

| 820,127 | 5/1906 | Pope | 126/438 X |
|---|---|---|---|
| 2,135,997 | 11/1938 | Arthuys | 353/3 |
| 3,049,055 | 8/1962 | Tubbs | 126/270 |
| 3,200,820 | 8/1965 | Garrett | 126/271 |
| 3,799,144 | 3/1974 | Ramsey et al. | 126/433 |
| 3,905,352 | 9/1975 | Jahn | 126/270 |
| 3,977,773 | 8/1976 | Hubbard | 350/292 |
| 3,993,528 | 11/1976 | Pauly | 126/270 |
| 3,998,206 | 12/1976 | Jahn | 126/271 |
| 4,126,123 | 11/1978 | Hall | 126/271 |
| 4,135,489 | 1/1979 | Jarvinen | 126/270 |
| 4,171,876 | 10/1979 | Wood | 126/424 X |

FOREIGN PATENT DOCUMENTS

2506905 8/1976 Fed. Rep. of Germany ........... 350/293

*Primary Examiner*—James C. Yeung
*Assistant Examiner*—Larry Jones
*Attorney, Agent, or Firm*—Donald M. Winegar; H. H. Green, Jr.

[57] ABSTRACT

A solar tracking point concentrator for a solar energy system comprises a light weight reflector in the shape of a paraboloid dish having a rim angle of approximately 109°, whereby the center of gravity of the reflector mass is coincident with the focal point of the paraboloid. The reflector is supported on a light weight pipe pedestal assembly and controllably driven by a light weight control-drive means so as to be angularly adjustable in both elevation and azimuth to track the sun and efficiently continuously reflect the sun's rays to a heat receiver disposed at the focal point of the paraboloid preferably in a fixed position. The reflector is mounted for controlled movement to effect such angular adjustments about horizontal and vertical axes which intersect at the focal point of the reflector paraboloid. The 109° paraboloid rim angle provides a paraboloid reflector that inherently has its center of gravity essentially coincident with its focal point. This arrangement provides an essentially balanced mounting of the paraboloid reflector without requiring counterbalancing means. Therefore, the paraboloid reflector may be supported by a light weight pipe pedestal assembly and driven by light weight control-drive means, such as linear stepping motors which are controlled by electronic pulses generated by light weight microprocessors.

23 Claims, 12 Drawing Figures

SOLAR TRACKING CONCENTRATOR

BACKGROUND OF THE INVENTION

The invention relates generally to solar energy utilization systems and particularly to an improved solar tracking concentrator which admirably lends itself to incorporation into a solar thermal energy collection and transport subsystem which may form part of a solar energy electrical power generation system.

It seems to be commonly assumed or agreed that one of the most pressing problems facing the nation at this time in history is that of energy and, more particularly, locating feasible energy sources that are economically competitive alternatives to traditional fuels, such as fossil fuels. There has been much research and development effort and activity directed at the development of solar central receiver electrical power generation systems. In one such system, a large field or array of individually driven and controlled mirror-like devices forming part of heliostats reflect the sun's rays to a common, focal, heat absorbing zone, i.e. the central receiver, which may be part of a boiler/superheater. The central receiver is a target for the reflected sun's rays, which are highly concentrated at the central receiver and may be collected at high temperatures in excess of 500 degrees Centigrade and subsequently used through known systems, such as steam-turbine driven electrical generating plants, to produce electricity or otherwise to provide thermal energy for other systems. Another system employs a plurality of distributed point focusing solar thermal concentrators which convert solar energy to steam and transport it to a central power conversion subsystem. Both government and industry recognize that before a solar energy electrical power generating system becomes a practical reality, it must be economically feasible, i.e. the cost of generation of a unit of electricity must be in a cost range that is comparable to or better than that of contemporary electrical power generating systems. Studies have indicated that the cost of heliostats, be they of the type used in central or point focusing receiver systems, is the largest factor in the overall cost of such a system. It has been concluded that the development of an operationally acceptable solar tracking point focusing concentrator which lends itself to ease of manufacture in quantity production, ready shipment to site, easy assembly and installation at site, and low cost maintenance over the expected life of the system, is highly desirable. Such an improved concentrator must produce or contribute to a significant reduction in initial cost and maintenance costs over the prospective life of the system.

SUMMARY OF THE INVENTION

A heliostat is a device which includes an optical reflective surface that is appropriately mounted, driven and controlled so as to continuously track the sun during the course of the day and reflect the sun's rays to a receiver. Although a complete heliostat comprises an assembly of components which includes the reflective surface, support structure therefor, a drive and control system therefor, and a means to protect particularly the reflective surface from injurious environmental conditions, such as wind, sand, snow and rain, likely to be encountered at the site of installation, this invention deals primarily with the provision of an improved solar tracking point focusing concentrator and some closely related components, which permit and contribute to the design of an overall improved heliostat.

Solar tracking point focusing concentrators according to the invention herein are extremely simple, light weight, use cost effective materials, made of few parts, permit the use of low cost mass production techniques, eliminate shipping problems to the installation site and lend themselves to semiautomatic and easy installation at the site with minimum labor. The aforesaid attributes provide an extremely low initial cost concentrator and result from applicant's unique parabolic reflector configuration and mounting, which produces or permits: (1) near optimal optical performance; (2) minimum volume within the concentrator's enclosure required for elevational and azimuth movement of the reflector; (3) an inherently balanced design which obviates the need for counter weights and the resultant heavy duty reflector drive means, and (4) a solar heat receiver-exchange device rigidly mounted at the focus of the reflector and secured to the pedestal and piping in permanently fixed position thereby obviating the need for movable joints in the high temperature, high pressure piping system. Applicant's unique parabolic reflector configuration and mounting comprises providing a reflector of dished parabolic configuration having a rim angle of approximately 109°, and mounting the reflector for rotation about horizontal and vertical axes to effect angular adjustments in elevation and azimuth, respectively, which axes intersect at the focal point of the paraboloid.

The extremely light weight solar tracking concentrator constructed in accordance with the invention lends itself to being supported by a simple pipe pedestal assembly which can be automatically inserted into the ground, and driven by a low cost, mass produced, linear stepping motor drive system which, in turn, lends itself to being controlled by accurate positioning microprocessors, which can be mass produced and operate on electronic position pulse counting techniques. Further, all elements of the drive and control systems can be factory installed and mounted on the pedestal frame assemblies.

OBJECTS OF THE INVENTION

It is an object of the invention to provide a light weight, inexpensive solar tracking concentrator that permits low cost mass production techniques to be employed for its manufacture; part and subassembly sizes small enough for conventional shipping; semiautomatic and simple installation, and easy maintenance.

It is a further object of the invention to provide an improved parabolic solar tracking concentrator which: (1) provides near optimal optical performance; (2) requires minimum room for elevational and azimuth movement of its reflector; (3) provides an inherently balanced mounting of the reflector, and (4) permits the mounting of a fixed heat receiver at the focus of the reflector.

It is a still further object of the invention to provide an improved light weight solar tracking concentrator that lends itself to being supported on a simple pipe pedestal assembly which permits automatic insertion into the ground by a machine, and driven and controlled by light weight drive and control components that are factory installed and mounted on the reflector and pedestal assembly of the concentrator.

It is another object of the invention to provide an improved light weight solar tracking concentrator that lends itself to being driven and controlled to track the sun by highly accurate potentially low cost mass produced electronic microprocessors and linear stepping motor drives.

Other and more particular objects of the invention will in part be obvious and will in part appear from a perusal of the following description of the preferred embodiment of the invention and the claims, taken together with the drawings.

DESCRIPTION OF PREFERRED EMBODIMENTS

Figure 1:
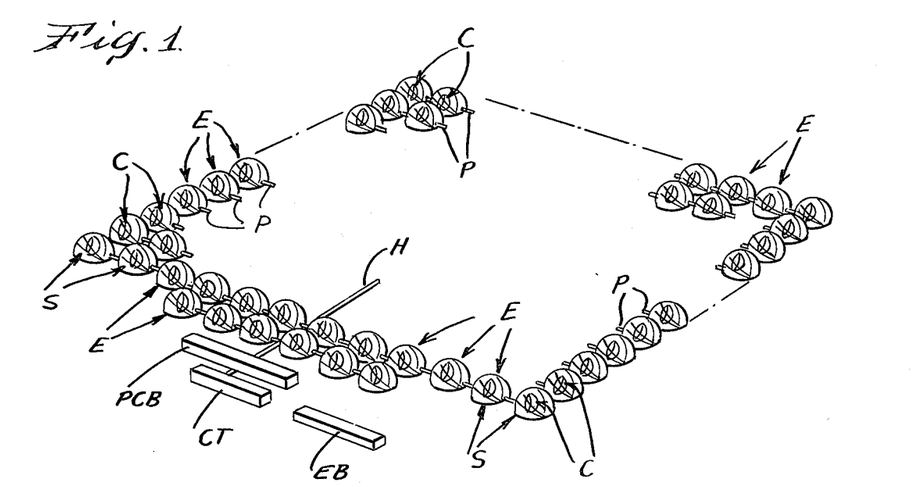
FIG. 1 is a sketch of a small solar energy power generation plant which incorporates the improved solar tracking concentrators of the invention.

FIG. 1 comprises a sketch of an aesthetic low profile deep set back one megawatt polar power plant which is well suited to incorporate my improved solar tracking concentrator. The FIG. 1 power plant is for illustrative purposes only and will be only generally described herein. For the purposes of achieving a one megawatt capacity for an approximate 0.4 load factor capability, the power plant comprises a field of 150 distributed air supported plastic bubble enclosures E, each of which houses one of my improved solar tracking concentrators. The enclosures are desirably machine installed on forty foot centers and utilize in situ soil as part of their foundation structure. A tract of just under eleven acres, which may be totally fenced and graded for local drainage specifications, is utilized. A perimeter set back of 100 feet may be employed to provide for aesthetic appeal, security considerations and a perimeter access driveway. In operation, each of the solar concentrators produces at its individual location superheated steam for power generation purposes which must be transported from the individual distributed concentrators to a central power conversion subsystem, e.g. a steam operated electrical power generating station. The steam effectively may be conveyed through a manually installed above ground vacuum insulated piping network that connects the field of concentrators with the power conversion subsystem. The piping network also provides a feedwater supply for the boilers located at each of the concentrators, and may also conveniently carry the electrical wiring for powering the control-drive means for the control and driving of the solar reflectors of the concentrators. In FIG. 1, the piping network may be generally understood. It comprises transverse pipes P for tying in the boilers of the concentrators. Pipes P communicate with main headers H which, in turn, communicates with the power conversion subsystem PCB. The pipes P and header H internally carry feedwater supply and superheated steam conduits. The conduits must be thermally insulated so they and/or the pipes and header are appropriately insulated. Particularly effective insulated piping networks are disclosed and claimed in the copending application of Daryl L. Renschler and Horton being filed concurrently herewith. The subsystem PCB includes the turbine generator set, condenser, pumps, valves, steam accumulator, water conditioning subsystem, feedwater heater, master control and computer. An energy storage subsystem, such as a battery unit, may optionally be employed when load factors above 0.4 are selected. If so, the energy storage submodule EB may be employed. A cooling tower subsystem CT is employed for known purposes. The foregoing represents a very general description of a small solar power generating plant in which my improved solar energy tracking point concentrators may be employed.

Figure 2:
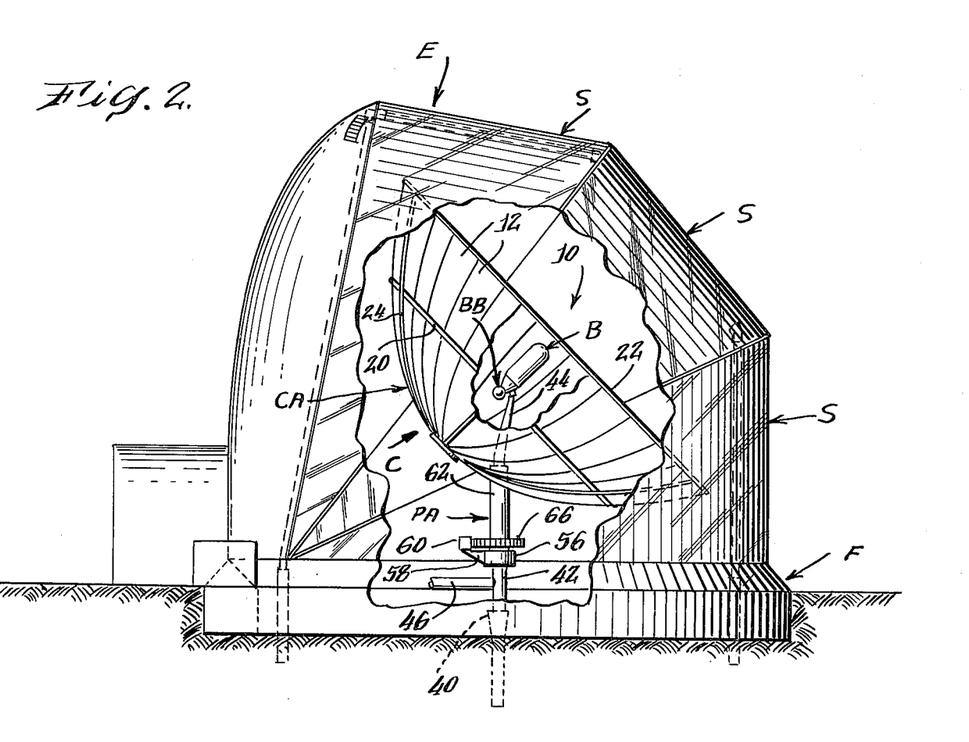
FIG. 2 is a side elevational view of an improved solar tracking concentrator installed for operation on site within a protective enclosure, with a portion of the enclosure broken away for clarity.

In FIG. 2 the improved concentrator is generally designated C and shown as housed within a protective enclosure E which protects the concentrator from environmental conditions. The protective enclosure generally includes a plurality of transparent plastic segments S and a foundation F. The specific construction of enclosure E forms no part of my invention being described and claimed in this application for it is described and claimed in the copending application Ser. No. 844,401 filed Oct. 21, 1977 entitled Solar Heliostat Enclosure, Enclosure Foundation And Installation Method And Machine Therefor of J. Zdeb and Horton. The detailed construction and operation of the enclosure is set forth in the referred to application. It may be briefly characterized as a low cost air supported bubble enclosure which includes a plurality of zipper connected panels of clear plastic material that are supported by air supplied by a blower unit provided for each enclosure. The foundation is ring shaped and connected to lower portions of the panels. The foundation is filled with in situ soil excavated at each enclosure location. Means is provided for personnel to have access to the interior of the enclosure for assembly, maintenance and repair. An internal rigid frame built of metal pipes is provided for lightning protection and for support of the bubble during non-powered air support periods, such as on calm days.

Figures 3, 4, 5:
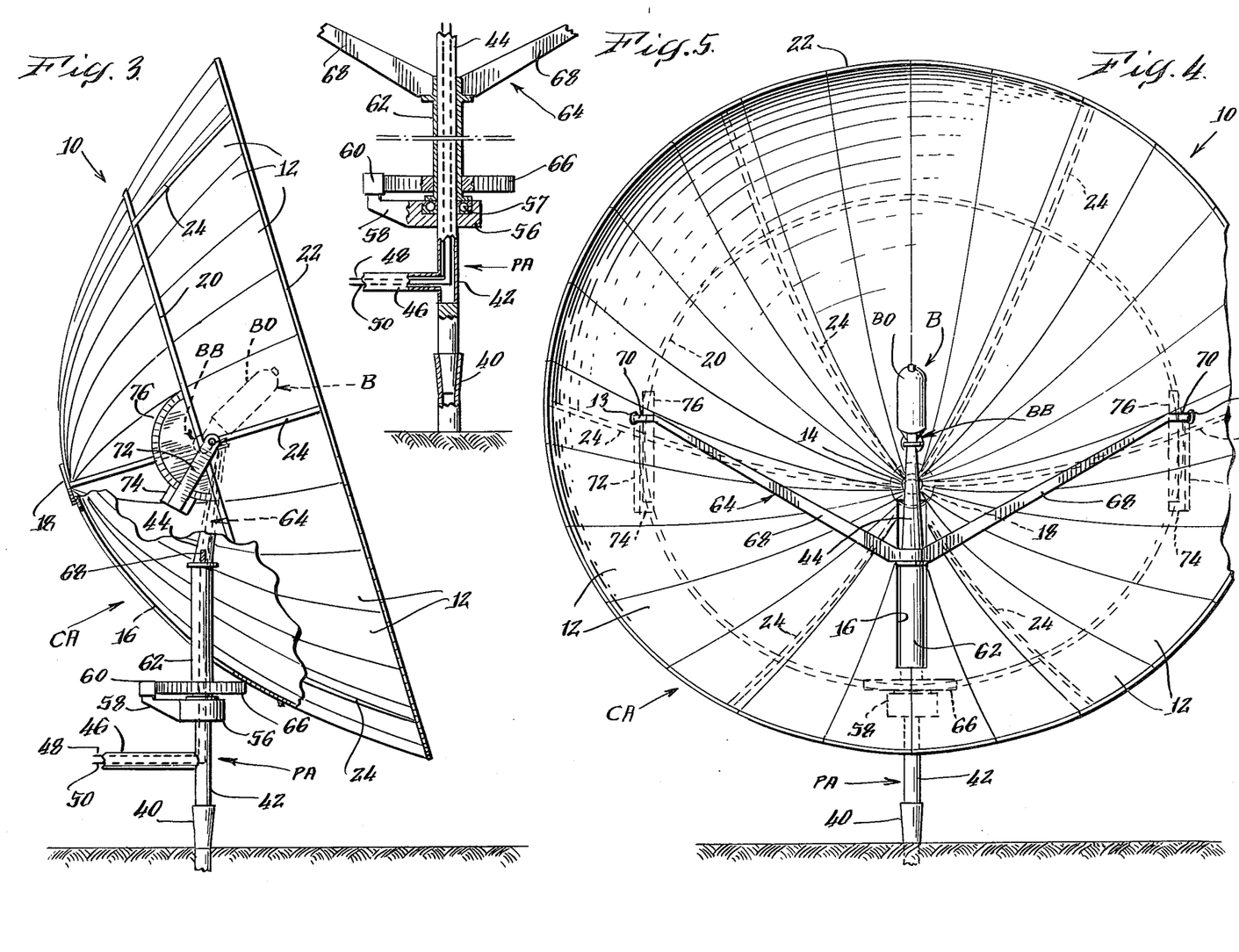
FIG. 3 is an enlarged, side elevational view of the improved solar concentrator, by itself, with a portion of the reflector broken away and some of the pipe pedestal assembly shown in cross section for clarity.
FIG. 4 is a front elevational view of the improved solar concentrator of FIG. 3 looking from the right thereof.
FIG. 5 is an enlarged view of the pipe pedestal, reflector support post and drive therefor.

My improved solar concentrator C comprises a collector assembly generally indicated as CA that is supported on a pipe pedestal assembly generally indicated as PA. The collector assembly is mounted on the pedestal assembly so as to be adjustable in azimuth and elevation angles and to be automatically controlled and driven for tracking the sun from sunrise to sunset. It is the improved concentrator construction to which my invention primarily addresses itself. With particular reference to FIGS. 3, 4 and 5, the collector assembly CA will be understood. The collector assembly CA comprises a light weight segmented structure parabolic dish reflector 10. The broad concept of the reflector construction was conceived by NASA in 1963 during its work to develop and demonstrate for space applications a thirty-two foot diameter aluminum honeycomb segmented structure parabolic dish. The dish reflector 10 is an assemblage of segmented leaves 12, each made of one-half inch thick aluminum honeycomb sandwich construction. The surfaces of the segments are stretch formed aluminum bonded to the core with thermosetting adhesive. The concave surface of the dish reflector 10 is coated with aluminized mylar so as to be reflective. The segments are formed so as to provide a central opening 14 in the dish reflector to facilitate assembly of the reflector segments by clip means. One or more of the segments which is located at the bottom of the assemblage of the dish reflector are formed so as to provide a rectangular slot 16. The slot permits a portion of the pipe pedestal assembly PA to extend through the reflector so as to permit vertical movement of the reflector 10 when its elevational angle is adjusted during operation. A pair of horizontally aligned openings 13 are formed in two segments to permit ends of a reflector supporting yoke to extend through the reflector as part of its mounting.

The reflector 10 is formed and supported by a frame comprising a plurality of support rings 18, 20 and 22 which are axially spaced, of circular configuration and of different diameters. Support ring 18 is the smallest central one disposed adjacent reflector central opening 14. The support rings are supported in predetermined positions to form a cage-like support frame for the reflector 10 by a plurality of arcuate radial brackets 24 which are secured to the support rings to form a sturdy cage-like frame for the reflector 10. To maintain the reflector and frame in assembled position, clips 26 are employed to secure the inner ends of the segments 12 at the opening 14 to the ring 18. When fully assembled, the reflector 10 and its support frame comprise the collector assembly CA, a functionally unitary structure which includes the dish-like reflector 10 of paraboloid configuration. The collector assembly CA is mounted on pipe pedestal assembly PA for controlled movement about horizontal and vertical axes to permit adjustment of the paraboloid reflector in either elevation or azimuth to aim at and track the sun. As the collector assembly is of light weight, it may be supported by a light weight supporting pipe pedestal assembly PA.

The pipe pedestal assembly PA is predicated generally on the single support pipe pedestal concept disclosed and claimed in the copending application Ser. No. 844,400, filed Oct. 21, 1977, now U.S. Pat. No. 4,209,236, of J. Zdeb and Horton, entitled Solar Central Receiver Heliostat Reflector Assembly. Because of the consciously designed light weight collector assembly employed in my concentrator, a light weight pipe pedestal assembly may be used to support the collector assembly and its control and drive systems. The pipe pedestal assembly PA also serves the additional function of providing a rigid mounting for the reflected radiated solar heat receiver-boiler B with the heat receiver BB at the focal point of my improved concentrator. It also provides support for the feedwater and steam conduits that are operatively associated with the boiler BO of the receiver-boiler B.

The pipe pedestal assembly is formed by securely installing an insert 40 for mounting the assembly into the ground at the site, as by employing a conventional drilling machine adapted for this purpose. The insert 40 comprises a rugged pipe section of suitable length for the soil conditions to be encountered at the site, which is hardened at its earth entry end for drilling and flared with a Morse taper socket at the other end. After the insert 40 is mounted, the remainder of the pipe pedestal assembly is simply and totally installed by manually inserting a matching Morse taper end on the main pedestal support post pipe 42 into the ground insert 40. A clamping device optionally may be used to additionally secure the assemblage. The pedestal assembly may be assembled and tested at the factory. It comprises the pipe 42, which is formed at its lower end with the Morse taper to facilitate mounting, centrally with means to rotatably support a reflecting yoke, and at its upper end with means to support the receiver-boiler B in fixed position. Pipe 42 supports an arm 44 which extends upwardly, is slightly inclined from the vertical and its upper end rigidly supports the receiver-boiler B in fixed position, as by a detachable pipe fitting flanged connection. As will be subsequently described in detail, the configurational and dispositional relationship of the concentrator components is such that the solar heat receiver ball BB of the heat receiver-boiler B is disposed in fixed position at the focal point of the paraboloid reflector 10.

The pipe 42 and the arm 44 are hollow and in communication. At the upper end of the arm 44 they communicate with the interior of the receiver-boiler B, and at their lower end they communicate with a horizontally extending hollow pipe 46. The pipe 42, arm 44 and pipe 46 are thermally insulated as by being vacuum jacketed, and house a feedwater conduit 48 and a steam conduit 50 (see FIG. 5). In operation, feedwater from a source is supplied through the conduit 48 to the boiler 52, where steam is generated because of the heat transfer from the heat pipe 54, as will be more fully explained, and the steam exits out the steam conduit 50 which preferably is lead through an insulated piping network of the type which forms the subject of the copending application of Daryl L. Renschler and myself, to a power conversion station and ultimately utilized for generating electricity. Of course, the steam may be otherwise directed to a steam utilization means, if desired.

The pipe pedestal assembly PA also serves to support on its main pipe 42 the reflector 10 for adjustment in azimuth and elevation. To achieve this mounting, a rigid bracket 56 is secured to the pipe 42. It includes an upwardly facing end bearing 57 and a laterally extending arm 58 which at its end supports a linear stepping motor 60. Rotatably mounted concentrically about a vertically central portion of the pipe 42 is a reflector support tube 62 which is supported at its lower end by end bearing 57, and at its upper end integrally carries a V-shaped yoke 64 which, in turn, supports the collector assembly CA. At its lower end, tube 62 has a rigidly secured drive wheel 66 that is operationally associated with the linear stepping motor 60. Linear stepping motors and drive wheels are known.

The collector assembly CA is carried by the yoke 64 in such a configurational and dispositional relationship that the common vertical axis of the pipe 42 and the tube 62 extend through the focal point of the paraboloid reflector. Therefore, rotation of the tube 62 about pipe 42 changes the azimuth angle of the reflector 10. The rotation of tube 62 is effected by the linear stepping motor 60 operating with the drive wheel 66 to rotate support tube 62 with its connected yoke 64 and the supported reflector 10 relative to pipe 42 about a vertical axis in either direction in a predetermined controlled manner as required to track the sun. Light weight, sun tracking microprocessor controls operating linear stepping motors are known.

The yoke 64 comprises a pair of upwardly oppositely extending inclined arms 68. The yoke, when the collector assembly is connected to it in operational position, is disposed within the confines of the paraboloid reflector 10, except for its opposite ends 70 which extend on a common horizontal axis through aligned openings 13 formed in two of the segments 12 forming the reflector 10. The yoke ends 70 extend through openings 13 to the exterior of the reflector 10. Each end 70 carries a radially extending arm 72 which at its free end supports a linear stepping motor 74 which, in turn, is operationally associated with a semicircular drive wheel 76. There are two drive wheels 76 rigidly secured to the support ring 20 of the collector assembly and extending rearwardly on the central rear exterior of the reflector. The arrangement is such that there is an operatively associated linear stepping motor 74 and drive wheel 76 at each lateral side of the collector assembly. Therefore, the reflector 10 may be selectively controllably adjusted in elevation by actuation of the stepping motors 74 in a known predetermined controlled manner to track the sun. The configuration and mounting of the reflector 10 is such that rotation of the reflector relative to the yoke occurs about a horizontal axis that passes through the focal point of the paraboloid reflector. Reflector elevational adjustments are made about a horizontal axis which passes through the focal point and, as previously described, azimuth adjustments are made about a vertical axis that passes through the focal point. Hence, the horizontal and vertical axes of rotation of the reflector intersect at right angles at the focal point. Further, as previously described, the solar heat receiver BB of the receiver-boiler B is mounted at the top of pedestal arm 44 in position to be disposed at the focal point of the paraboloid reflector. This, of course, is a position which exposes it to the maximum amount of radiated solar energy reflected by the reflector 10. Also, it requires the minimum amount of room for movement of the reflector in its enclosure.

Figures 6, 7, 8, 9:
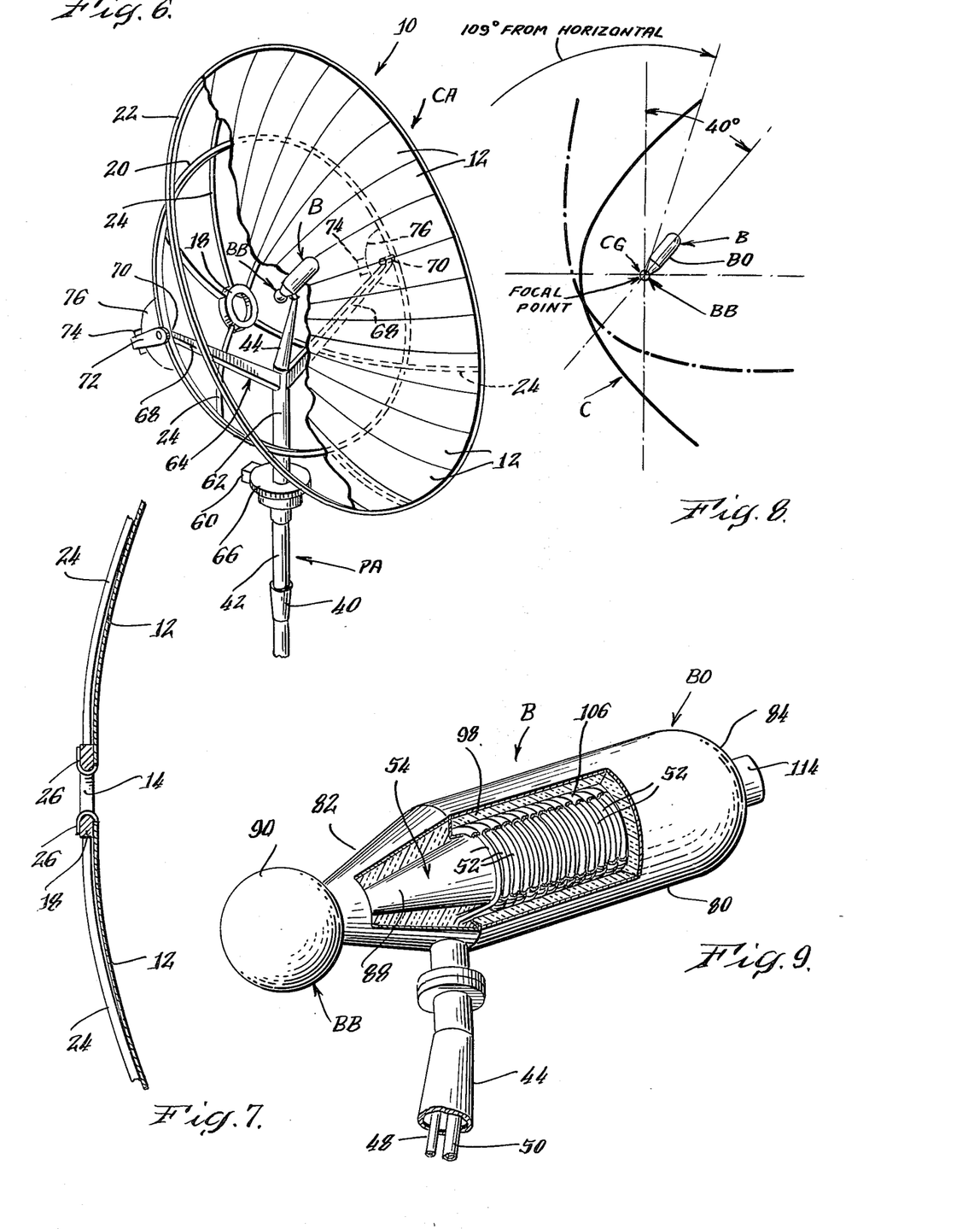
FIG. 6 is a perspective front view of the FIGS. 3 and 4 improved solar concentrator.
FIG. 7 is a sectional view taken through the central portion of the reflector to show an assembly detail.
FIG. 8 is a schematic view showing the geometry of the paraboloid configuration and mounting relative to its axes of rotation, focal point and the heat receiver disposition.
FIG. 9 is a perspective view, with portions broken away for clarity, of a heat receiver-boiler that may be used in conjunction with my improved solar concentrator.
Figures 10, 11, 12:
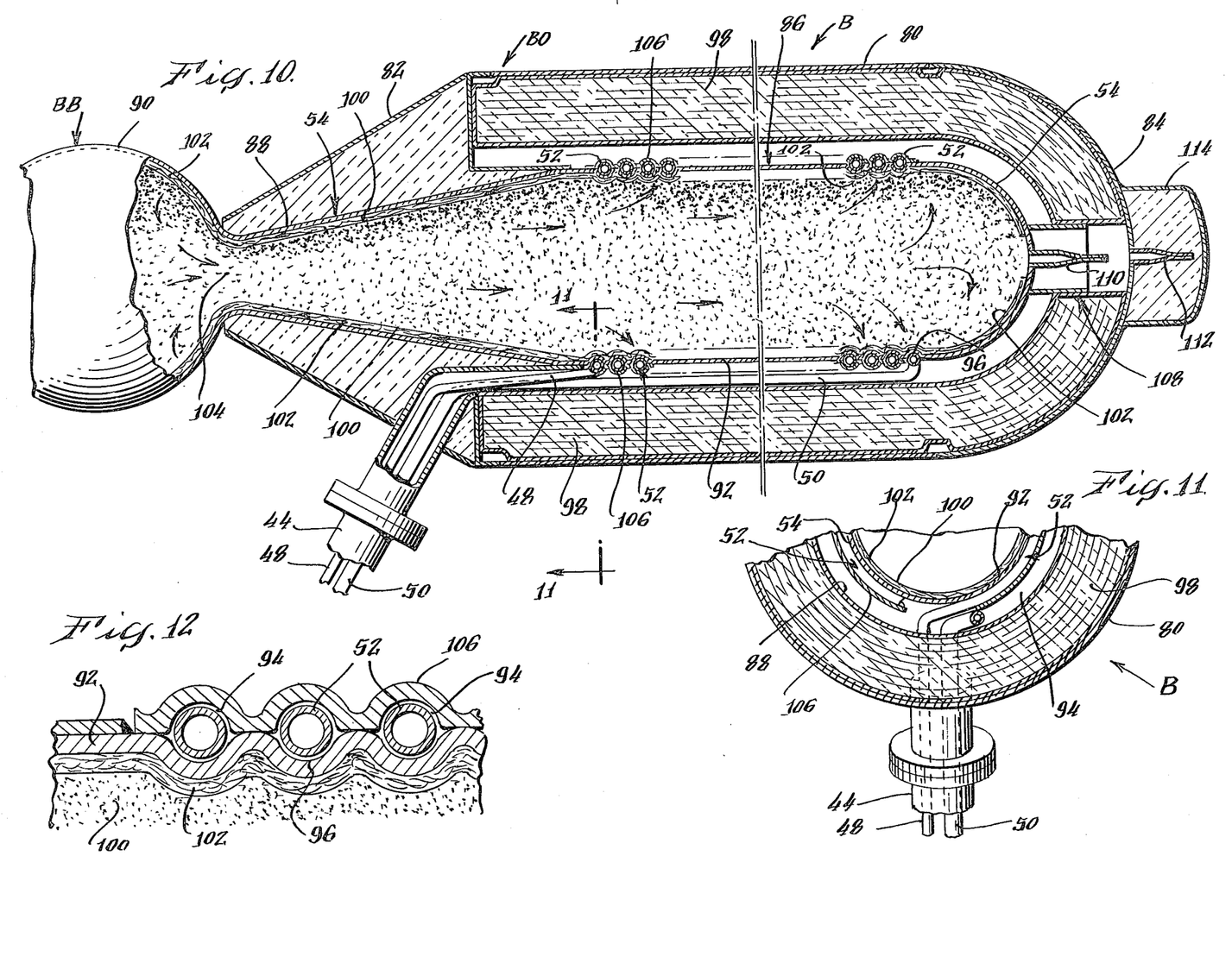
FIG. 10 is a central longitudinal sectional view of the heat receiver-boiler of FIG. 9 on an enlarged scale.
FIG. 11 is a sectional view taken on line 11—11 of FIG. 10.
FIG. 12 is an enlarged view of a portion of FIG. 10 showing the detailed construction of the heat pipe, boiler monotube interface.

A unique feature of my invention is the selection of the 109° rim angle for the paraboloid. See FIG. 8 for a diagram of the geometry of a paraboloid having a 109° rim angle. This rim angle, under the geometry of a paraboloid structure inherently results in the center of gravity of the structure being at the focal point. Thus, the weight of the reflector 10 is balanced about its rotating axes in all directions. Therefore, only the lowest torque requirements are necessary for the drive system for the reflector, which permits the use of light weight components. This avoids the heavy high capacity motors required by prior art devices that employ counter-weights to balance their reflectors. This rim angle also produces optimum optical efficiency for a collector assembly.

It will, therefore, be understood that my reflector configuration and mounting is such as to produce reflector rotational axes that intersect at the focal point of the reflector, as well as a reflector center of gravity at the focal point. Hence, the focal point is coincident with the center of gravity and the rotational axes intersection. The arrangement is highly desirable in that: (1) it produces a reflector with near optimal optical performance, (2) it produces an inherently balanced reflector without counter-weights, (3) it requires minimum enclosure volume for reflector movement in normal operation, and (4) it permits stationary mounting of a solar heat receiver at the focus of the reflector.

One of the advantages of the unique configuration and mounting of the reflector is to permit locating the solar heat receiver, i.e. spherical boiler BB, at the focus of the reflector. Although it could be part of a variety of solar heat apparatus, the spherical boiler BB may conveniently form a part of the solar heat receiver-boiler B. The detailed construction of heat receiver-boiler B is shown in FIGS. 9–12, which illustrate a highly effective construction. The solar heat receiver portion BB is a spherical ball and substantially totally unshielded to permit maximum utilization of the reflected radiated rays of the sun which, due to 109° rim angle of the reflector, are reflected and impinge on substantially the entire spherical surface of ball BB. The only ball portion that the sun's rays do not contact is the portion of the ball BB that is connected to the boiler portion BO of the receiver-boiler B. This arrangement is nearly optimum optically.

The boiler portion BO is essentially elongated and cylindrical shaped and has its longitudinal axis disposed at an angle of 40° from the vertical (see FIG. 8) which is considered to be a most effective disposition as it invokes the force of gravity to aid in refluxing of the vaporizable working fluid used in the receiver-boiler. The receiver-boiler functions to absorb reflected solar radiated heat concentrated by the reflector 10 on the heat receiver ball BB, and to transfer this heat through a heat pipe to the feedwater that is disposed in the boiler of receiver-boiler. A desirable boiler is a helically coiled monotube once-through steam generator that surrounds the condenser portion of a potassium heat pipe to generate superheated steam, which may thereafter be utilized as steam power. The boiler portion BB is formed by cylindrical metal casing 80 that at one end has a conical portion 82 which is attached to the ball BB. The other end of casing 80 is closed by end wall 84. The potassium heat pipe designated 54 is formed by a metal envelope that has a portion 86 that is generally correspondingly shaped to the casing 80 and disposed concentrically within it. The envelope includes a conical reduced portion 88 and an integrally formed essentially spherical body 90 which forms the heat receiving ball BB. Ball BB comprises the evaporation region of the heat pipe 54. The envelope has an elongated cylindrical portion 92 disposed around the condenser region of the heat pipe 54 that is thermally coupled to the helically coiled monotube once-through steam generator 52 by conduction and radiation across a helium filled helical gap 94 (see FIG. 12). The elongated cylindrical portion 92 of the heat pipe forming envelope comprises the condenser region-heat sink portion thereof. The steam generator 52 is helically wrapped around the heat sink portion 92 and disposed in a helical corrugated groove 96 formed in the envelope wall forming the heat sink portion 92 of the heat pipe. The gap 94 is formed by the groove 96 and a helically grooved enclosing copper jacket 106, which is hermetically sealed to heat sink portion 92. Enclosing the steam generator 52 and heat sink portion 92 of the heat pipe is an annular hermetically sealed multifoil superinsulation capsule 98. The feedwater and super-heated steam conduits 48 and 50, which are insulated, as by encapsulated multifoil wrappings, are connected to opposite ends, i.e. input and output, respectively, of the monotube generator, and extend to and from the receiver-boiler. They extend out through the boiler portion B0 at a location near its lower end, and through the hollow support arm 44 of the pipe pedestal assembly. Arm 44 may be vacuum jacketed to further insulate the conduits 48, 50. The receiver-boiler B is mounted on the arm 44 in an inclined stationary position, with the center of its heat receiver body 90 disposed at the lower end at the focal point of the reflector 10.

Solar radiation is reflected and focused by the reflector 10 on the surface of the heat receiver body 90, which is the heat input surface of the evaporation region of the heat pipe 54. Body 90 forms a part of an overall heat pipe 54, which is a metal envelope outlined by cylindrical heat pipe wall 86, conical portion 88 and spherical portion 88 and spherical body 90. The surface of the body 90 is selected to maximize high solar radiation absorption activity consistent with long life of the body. A quantity 100 a vaporizable working fluid, preferably potassium in liquid form, is disposed within and partially fills the envelope forming the heat pipe 54. A wick 102 having capillary formations to transport working fluid is disposed within the heat pipe 54 and substantially throughout the entire inner surface of the metal envelope that forms heat pipe 54. As the potassium liquid disposed in the portion of the wick adjacent the inner wall of body 90 is heated, it vaporizes and flows through the elongated vapor duct in the envelope that extends through the constricted neck 104 of the envelope between the body 90 and heat sink portion 92. Potassium vapor travels through the vapor duct from within the body 90 to the interior of the heat sink portion 92 where it condenses on the inner surface of the corrugated wall portion of the heat sink portion 92. It is cooled by conduction and radiation of its heat across the helium filled gap 94 to heat the steam generator coil 52. Thereafter, it refluxes back through the wick 102 to the interior of the body 90. Gravity, due to the inclined orientation of the receiver-boiler, strongly assists refluxing. The wick 102 may conveniently consist of several layers of 100 mesh stainless steel wire cloth and performs the following functions: One, it distributes liquid potassium over the inner surface of the body 90 in a thin film from which it is evaporated out of the wick pores without deleterious bubble formation. As the sun is tracked, the solar heated area of the heat absorbing surface of body 90 moves. This requires good working fluid distribution, which is accomplished through the capillary action of the wick. Two, it distributes working fluid over the inclined inner surfaces of the heat pipe following shutdown preparatory to start up. Three, it distributes a thin film condensate over the inner surface of the heat sink portion 92 to assure high thermal conductance and well distributed return of condensate to the evaporator region in body 90. Four, it constrains capillary forces of the refluxing condensate in the reduced neck portion 104 where vapor velocity is high to avoid entrainment in the vapor stream, i.e. undesirable foaming of the working fluid.

The heat pipe envelope is attached to the outer casing 80 within the thermal insulating capsule 98. Lateral support for the heat pipe is provided by a sliding joint 108 between adjacent ends of the heat pipe envelope and the insulating capsule at one end of the heat receiver-boiler assembly. The sliding joint support as such is not to constrain relative axial thermal expansion of the heat pipe envelope within the casing 80. The monotube steam generator helix 52 is positioned between the helically grooved corrugated wall 96 of the heat pipe envelope and copper cap fin pieces 106 which are brazed to the corrugated wall portion 96 and form a helically grooved jacket that cooperates with wall 96 to form a gap 94 for housing the monotube boiler and which is helium filled. For the latter purpose, spacers are provided to maintain an approximately uniform helium filled gap between the heated heat sink wall surfaces and the monotube steam generator, thus ensuring a moderate circumferentially uniform flux on the steam generator tube surface and permitting freedom for independent expansion of the heat pipe envelope and the boiler generator coil through wind-unwind motion of the coil in its loosely confined mounting. The insulating structure enclosing the monotube steam generator may be Linde nickel foil-refrasil encapsulated in a vacuum. At the upper end of the heat receiver-boiler B, seal off tubes 110 and 112 are provided for evacuation and filling of the heat pipe 54 with potassium and the helical gap 94 with helium, respectively. The access opening for these tubes in the end of outer casing is covered by an insulation cap 114.

A suitable material for the heat pipe, wicking, the external casing and the monotube steam generator coil is ustenitic. The advantages of this material include excellent fabricability and weldability, good strength and corrosion resistance at the operating temperatures contemplated, a thermal expansion coefficient matching that of copper, which is used for the corrugated jacket fin structure, and well proven compatibility with potassium. The major disadvantage of this material is relatively low thermal conductivity, which is objectionable insofar as the relatively high input wall temperature drop to the body 90 is concerned.

The monotube steam generator 52 functions to transform feedwater supplied at approximately 400° F. into superheated steam at approximately 950° F. as a result of the transfer of the solar thermal energy supplied by the heat pipe at 1250 psia by one pass through a single continuous boiler tube. The monotube configuration minimizes a number of boiler tube connections which enhances reliability. The once-through feature eliminates the high pressure recirculating pump, the steam drum and the liquid separators employed in recirculating boilers, further increasing simplicity and reliability, as well as significantly reducing cost. By positioning the steam generator tubing in the helium filled space, significant thermal stress problems affecting the generator tubing, if it were directly exposed to the heat pipe fluid or attached directly to the heat pipe itself, are eliminated.

With the reflector configuration and mounting described, it will be understood that the reflector 10 will be automatically driven to track the sun and will reflect the sun's rays over most of the surface of the solar heat receiver ball BB formed by body 90. The reflected solar energy impinging on the outer surface of the body 90 during the course of the day is conducted to its inner surface, the evaporator region, where it vaporizes potassium liquid in the wick which flows out through the reduced neck portion 104 to within cylindrical heat sink portion 92, the condenser region, where it condenses in the wick 102 disposed on the inner surface thereof, on transfer of its heat across the helium filled space 94 to the monotube generator 52 to heat the feedwater therein. The condensed potassium then refluxes, i.e. flows through the wicking to the interior of the body 90, where the solar heat transfer process resulting in potassium vaporization continues. The feedwater is supplied to the monotube generator 52 from a source through feedwater supply conduit 48, and after being transformed into superheated steam, it exits through the steam conduit 50. The pipe pedestal assembly support tube 42 and conduits 48 and 50 are insulated to minimize heat losses. The feedwater tube 48 and steam tube 50, which may be encapsulated in multifoil insulation, both laterally exit out a lower portion of the support pipe 42 into a horizontal transfer pipe 46, which preferably is also insulated. The conduits 48, 50 are housed, thereafter, in the insulated piping network including piping P and header H to direct the steam to the power conversion station PCB. It will be understood that both the feedwater supply conduit and the steam conduit (48, 50) extend throughout the piping network to a source of feedwater supply and the steam utilization means of the power conversion station, respectively. It will also be understood that the piping network may also support electrical cables from a source to provide electrical energy for the reflector control and drive means which form a part of the solar energy concentrators that are distributed about the field in their respective enclosures.

In view of the foregoing, it should be apparent that I have achieved the objects of this invention. As will be apparent to those skilled in the art, various changes and modifications of the invention can be made without departing from the spirit and scope of the invention, which is limited only by the following claims.

I claim:
1. In a solar energy system, the combination of:
A. a solar reflector in the shape of a paraboloid dish having a reflective surface formed on its concave side; said paraboloid having a rim angle of approximately 109° whereby the center of gravity of the reflector is coincident with the focal point of the paraboloid; and
B. means for supporting said reflector for selectively controlled predetermined angular movement about the focal point of the paraboloid to adjust the elevation and azimuth angles of the reflector to track the sun during its normal daily apparent travel between sunrise and sunset, whereby said reflector is mounted in balanced condition about its focal point without requiring counterweights.

2. The combination of claim 1 which further includes a stationary solar heat receiver rigidly disposed at the focal point of the paraboloid.

3. The combination of claim 2 wherein said solar heat receiver forms part of a receiver-boiler assembly.

4. The combination of claim 3 wherein said supporting means comprises a light weight pipe pedestal, and said receiver-boiler assembly is mounted on said pipe pedestal.

5. The combination of claim 4 wherein said pipe pedestal comprises a pipe having a yoke at its upper end which pivotally supports said reflector about a horizontal axis passing through the focal point for angular adjustment in elevation.

6. The combination of claim 5 wherein drive wheel means is secured to said reflector, and a linear stepping motor means is supported by said pipe in operative association with said drive wheel means, whereby the elevation angle of said reflector may be adjusted by activation of said motor means.

7. The combination defined in claim 6 wherein said pipe is pivotally mounted for selective rotation about a vertical axis so as to permit adjustment of the azimuth angle of said reflector; an azimuth drive wheel is secured to said pipe, and a linear stepping motor is positioned in operative association with said azimuth drive wheel, whereby the azimuth angle of said reflector is adjustable by activation of said linear motor.

8. The combination of claim 7 wherein said pipe is rotatably mounted about and supported by a concentric fixed pipe which is stationary and supports said receiver-boiler at its upper end.

9. The combination of claim 8 wherein said stationary pipe houses feedwater and steam conduit means that communicate and are operatively associated with the boiler of said receiver-boiler assembly.

10. The combination of claim 3 wherein said supporting means comprises a vertically extending pipe rigidly installed in the ground at its lower end; said pipe supporting said receiver-boiler assembly so as to position said receiver at the focal point; the boiler portion of said receiver-boiler assembly being operatively associated with a feed water supply conduit and a steam conduit; said conduits extending vertically through said pipe and exiting near the ground, whereby they may interface with a feed water supply and steam subsystem.

11. The combination of claim 10 wherein said fixed pipe has a portion disposed about a vertical axis which passes through the focal point; and a second pipe is rotatably mounted concentrically about said portion of said fixed pipe for controlled rotation about the vertical axis; and said second pipe at its upper end supports a yoke which pivotally supports said reflector about a horizontal axis passing through the focal point.

12. The combination of claim 11 wherein a drive wheel is secured to said second pipe; and a linear stepping motor is secured to said fixed pipe in operative association with said drive wheel, whereby said second pipe is selectively rotated by activation of said motor to adjust the azimuth angle of said reflector.

13. The combination of claim 12 wherein a linear stepping motor is supported at each yoke end; and a pair of drive wheels is secured to said reflector, each one adjacent to and operatively associated with one of said motors, whereby the elevation angle of said reflector may be selectively adjusted by activation of said motors.

14. The combination of claim 11 wherein a linear stepping motor is supported at each yoke end; and a pair of drive wheels is secured to said reflector, each one adjacent to and operatively associated with one of said motors, whereby the elevation angle of said reflector may be selectively adjusted by activation of said motors.

15. The combination of claim 10 wherein said pipe is vacuum jacketed to thermally insulate said conduits.

16. The combination of claim 10 wherein said conduits are individually thermally insulated.

17. The combination of claim 16 wherein said conduits are individually encapsulated in multifoil insulation.

18. The combination of claim 1 wherein a protective enclosure is disposed about said reflector.

19. The combination of claim 15 which further includes light weight tracking drive means for driving said reflector to track the sun.

20. The combination of claim 1 wherein said reflector comprises a light weight aluminum honeycomb structure, and said reflective surface comprises a coating of aluminized mylar.

21. The combination of claim 1 wherein said reflector comprises a light weight structure; and said supporting means comprises a pipe portion which extends through a slot in said reflector.

22. The combination of claim 1 wherein said reflector comprises a support frame comprising a plurality of spaced support rings of different diameters interconnected by a plurality of arcuate radial brackets; and said paraboloid dish is formed by a plurality of segments which are mounted in and supported by said frame.

23. The combination of claim 22 which further includes light weight sun tracking drive means which include drive wheel means secured to one of the support rings of said frame.

* * * * *